United States Patent Office 3,499,024
Patented Mar. 3, 1970

3,499,024
2-HYDROXY-HYDROCARBYL ACRYLONITRILES AND PREPARATION THEREOF BY CONDENSATION OF ACRYLONITRILE AND ALDEHYDES
Ken-Ichi Morita, Zennosuke Suzuki, and Hiromitsu Hirose, Kamakura-shi, Japan, assignors to Toyo Rayon Kabushiki Kaisha, Tokyo, Japan, a corporation of Japan
No Drawing. Filed Dec. 19, 1966, Ser. No. 602,495
Claims priority, application Japan, Dec. 24, 1965, 40/79,319; Dec. 25, 1965, 40/79,595; Mar. 29, 1966, 41/18,933
Int. Cl. C07c 121/02, 121/36
U.S. Cl. 260—465
6 Claims

ABSTRACT OF THE DISCLOSURE

Alpha beta ethylenically unsaturated compounds, having the formula:

$$CH_2=C-CN$$
$$|$$
$$R-CH-OH$$

wherein R is selected from the group consisting of alkyl radicals having from 1–12 carbon atoms, cycloalkyl radicals, aralkyl radicals and aryl radicals and substituted aryl and aralkyl radicals, and the process for the preparation thereof which comprises reacting an alpha, beta-ethylenically unsaturated compounds with an aldehyde containing between about 2–13 carbon atoms in the presence of an amount of tertiary phosphine.

---

This invention relates to a process for preparing alpha, beta-ethylenically unsaturated compounds comprehending new compounds, and also new acrylonitrile derivatives.

Acrylonitrile, acrylic esters and the derivatives thereof have been widely used in the past either as monomers of various resins or as material for the manufacture of organic chemicals. The acrylonitrile derivatives having, for example, the hydroxyhydrocarbyl radical (of more than 1 carbon atom) in the 2-position have however not been known at all prior to this invention.

An object of this invention is to provide valuable alpha, beta-ethylenically unsaturated compounds which possess per se great polymerization activity and are useful as monomers for the preparation of such as adhesives, paints and resins for molding, as well as are valuable as intermediates for the manufacture of various organic chemicals.

Another object is to provide a new process for preparing alpha, beta-ethylenically unsaturated compounds, whereby these compounds can be prepared with a simple process from low cost materials.

A further specific object of this invention is to provide new acrylonitrile derivatives which have the hydroxyhydrocarbyl radical in the 2-position.

According to this invention, alpha, beta-ethylenically unsaturated compounds having the following formula are provided.

(I)
$$CH_2=C-X$$
$$|$$
$$R-CH-OH$$

wherein X is CN or COOR radical and R is a hydrocarbon radical of 1 to 12 carbon atoms.

R in the above formula is preferably either an alkyl radical of not more than 12 carbon atoms, and particularly not more than 8, a cycloalkyl radical of 5 to 12 carbon atoms, and particularly 5 to 8, an aryl radical of 6 to 12 carbon atoms, an aralkyl radical of 7 to 12 carbon atoms, or an alkenyl radical of 3 to 8 carbon atoms. The foregoing radicals, when specifically illustrated, include the straight chain or branched alkyl radicals such as methyl, ethyl, propyl, butyl, pentyl, hexyl, octyl, nonyl, decyl and dodecyl; the cycloalkyl radicals such as cyclopentyl, cyclohexyl, cycloheptyl, cyclooctyl and cyclodecyl; the aryl radicals such as phenyl, naphthyl and tolyl; the aralkyl radicals such as benzyl; and the alkenyl radicals such as allyl. Of these hydrocarbon radicals, the aryl and aralkyl radicals may be ones whose nucleus is substituted by a substituent such as halogens, or the nitro, lower alkoxy or lower carboalkoxy radical.

Of the compounds comprehended by the aforesaid Formula I, the acrylonitrile derivatives of the following formula are new compounds unreported as yet in literature.

(II)
$$CH_2=C-CN$$
$$|$$
$$R-CH-OH$$

wherein R has the meaning hereinbefore defined.

The acrylonitrile derivatives which are especially valuable in this invention are the 2-(1-hydroxyalkyl) acrylonitriles and 2-(alpha-hydroxybenzyl) acrylonitriles having the formula:

$$CH_2=C-CN$$
$$|$$
$$CH-OH$$
$$|$$
$$\text{(phenyl)}-(Y)_n$$

wherein Y is halogen, hydrogen, or nitro, lower alkyl or lower alkoxycarbonyl radical, and $n$ is an integer 1 to 5.

According to this invention, the aforesaid alpha, beta-ethylenically unsaturated compounds of Formula I are obtained by a new process which comprises reacting a compound of the formula $CH_2=CH-X$, wherein X is a CN or COOR radical and R is a hydrocarbon radical of 1 to 12 carbon atoms, with an aldehyde of 2 to 13 carbon atoms in the presence of a catalytic amount of a tertiary phosphine.

The aldehydes used in this invention having the formula RCHO, wherein R has the meaning hereinbefore defined, include, e.g., acetaldehyde, propionaldehyde, n-butyraldehyde, iso - butyraldehyde, n - valeraldehyde, iso - valeraldehyde, n - caproaldehyde, n - heptanal, n - octanal, n-dodecanal, benzaldehyde, chlorobenzaldehyde, nitrobenzaldehyde, m - tolualdehyde, alpha - phenylacetaldehyde, cyclohexylaldehyde and cyclooctylaldehyde. The acrylic esters, one of the starting materials of this invention, are exemplified by methyl acrylate, ethyl acrylate, n- or iso-propyl acrylate, n-, iso, sec., or tert. butyl acrylate, hexyl acrylate, octyl acrylate, cyclohexyl acrylate, alkyl acrylate and phenyl acrylate.

The tertiary phosphines to be used as catalyst in the invention process are preferably tertiary phosphines which have at least one aliphatic radical attached to the phosphorus atom from the standpoint of their activity. Such tertiary phosphines are represented by either the formula:

$$R^1R^2R^3P$$

wherein $R^1$, $R^2$ and $R^3$ are either an aliphatic or aromatic radical with the proviso that at least one of them is a saturated aliphatic radical; or the formula $$R^4—PR^5$$

wherein $R^5$ is an aliphatic radical and $R^6$ is a divalent hydrocarbon radical. Examples of the foregoing tertiary phosphines include trimethylphosphine, triethylphosphine, tributylphosphine, trihexylphosphine, tricyclooctylphosphine, diethylcyclohexylphosphine, diphenyl - 4 - hydroxybutylphosphine, phenyldibutylphosphine, tribornylphosphine, 1-phenyl-3-methyl-3-phospholene.

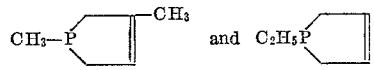

It is preferable that each of the hydrocarbyl radicals attached to phosphorus constituting the tertiary phosphine should have not more than 12, particularly not more than 8, carbon atoms.

While the foregoing tertiary phosphines are used in a so-called catalytic amount, the amount used varies depending upon the tertiary phosphine compound used. Generally, their use in an amount of about 0.0001–0.1 mole, and preferably 0.001–0.01 mole, of the acrylonitrile or acrylic ester will do. It practicing the invention process, the use of the aldehydes in an amount of 0.5–5 moles, and particularly 0.7–3 moles, is to be preferred. A reaction temperature in a range of −20° to 250° C., and particularly 30 to 180° C., is desirable. Although the presence of a reaction medium is not necessarily required, the use of an inert organic solvent is desirable. Inert organic solvents of this sort include such as acetonitrile, cyclohexane, tert.-butyl alcohol, dioxane, tetrahydrofuran, diethylene glycol, dimethyl ether, dimethylformamide, toluene pyridine and benzene.

According to this invention, it was found that if a tertiary amine was added to the reaction system when using acrylonitrile as a starting material the reaction would proceed much more favorably even when the aforesaid tertiary phosphine is used in a small amount. Suitable tertiary amines are those whose basic tenacity PKa at 25° C. is at least 5. The foregoing PKa is defined by the following expression:

$$PKa = -\log \frac{[R_36N][OH_3^+]}{[R_36NH^+]}$$

wherein the $R_36N$ is an amine, the several R6 of which represent a hydrocarbon radical.

As suitable tertiary amines can be used the aliphatic tertiary amines, aromatic tertiary amines, heterocyclic tertiary amines and mixed aliphatic-aromatic amines. Examples of these tertiary amines include such compounds as trimethylamine, triethylamine, tributylamine, N-methylpyrrolidine, N-ethylpyrrolidine, N-methylmorpholine, N-bicyclo[2,2,2]octylpyrrolidine, dimethylaniline, pyridine and quinoline. The tertiary amine is preferably used in an amount of 0.01 mole to 10 moles per each mole of the material acrylonitrile.

A polymerization inhibitor can also be added to the reaction system in practicing the invention process. Suitable polymerization inhibitors are hydroquinone and tert.-butylpyrocatechol.

The atmosphere of the reaction system should preferably be either a nonoxidizing atmosphere such as of nitrogen or argon or reduced pressure, it being desirable to avoid the presence of air, as far as possible.

Thus, a new acrylonitrile derivative having the alpha-hydroxyhydrocarbon radical in the 2-position can be obtained according to this invention. It was found that the new acrylonitrile derivative of this invention had great polymerization activity. Hence, it could be used alone or by being combined into a composition with other comonomers to become the starting material for the preparation of adhesives, paints, resins for molding use or fiber-forming polymers. For example, the new acrylonitrile derivative of this invention can be copolymerized with acrylonitrile to improve the dyeability and absorption property of acrylonitrile fibers. Further, since the new acrylonitrile derivative of this invention possesses the two functional radicals of nitrile and hydroxyl radicals, the synthesis of a wide variety of compounds is possible using this acrylonitrile derivative.

A process for preparing an acrylic acid derivative having the alpha-hydroxyhydrocarbon radical in the 2-position and having also a free carboxylic acid radical by using acetylene derivatives as the starting material has been known prior to this invention (German Patent No. 855,110).

This process is very difficult however, and there were many drawbacks in its commercial practice. In addition, the yield was also generally low.

In contradistinction, according to the process of this invention, it is possible to obtain in relatively good yield a wide variety of acrylic ester derivatives having the alpha-hydroxyhydrocarbon radical in the 2-position by using as the starting material the relatively low cost acrylic esters and reacting them with any of the optional aldehydes in the presence of a tertiary phosphine. The acrylic ester derivatives according to this invention can be used as starting materials for the preparation of paints, adhesives and resins for molding use.

For a further understanding of this invention the following examples are given, it being understood that these examples are in illustration and not in limitation of the invention in no sense whatsoever.

Example 1

5.7 grams of commercial special grade acrylonitrile and 4.4 grams of n-butylaldehyde were dissolved in 30 ml. of purified dioxane. While boiling this solution under reflux in a stream of nitrogen, 0.6 gram of tricyclohexylphosphine in 10 ml. of dioxane was added dropwise to the solution over a period of 20 minutes. After boiling the reaction mixture for 16 hours under reflux, the solvent was distilled off to yield after vacuum distillation of the residue 6.63 grams of 2-(1-dihydroxybutyl) acrylonitrile having a boiling point of 76–77° C. (0.5 mm. Hg).

Infrared Spectrum of the Product: 229 cm.$^{-1}$ (CN); 1,623 cm.$^{-1}$ (c=c double bond).

Nuclear Magnetic Resonance Spectrum of the Product: 3.98, 4.30τ (terminal double bond); triplet centered at 5.78τ (J=6 C.P.S.) (hydrogen on a carbon atom bearing hydroxyl group).

Ultimate Analysis of the Product:

|  | C | H | N | Molecular weight |
|---|---|---|---|---|
| Theoretical value | 67.17 | 8.86 | 11.19 | 125 |
| Analytical measured value | 67.44 | 8.97 | 11.36 | 122 |

Example 2

One gram of tricyclohexylphosphine was dissolved in 60 ml. of dioxane, after which this solution was boiling under reflux in a stream of nitrogen. To this solution were then added dropwise over a period of 6 hours 22 grams of acrylonitrile and 34 grams of acetaldehyde dissolved in 30 ml. of dioxane. After completion of the dropwise addition of the latter solution, the reaction mixture was boiled under reflux for a further 5 hours. The solvent was then distilled off from the reaction mixture, a small amount of pyrogallol was added thereto, followed by vacuum distillation of the product, whereupon was obtained 2-(1-hydroxyethyl) acrylonitrile having a boiling point of 77–78° C. (7 mm. Hg) at a conversion rate of 25% and a yield of 88%, based on the acrylonitrile.

Infrared Spectrum of the Product: 2,229 cm.$^{-1}$ (CN); 1,623 cm.$^{-1}$ (c=c double bond).

Nuclear Magnetic Resonance Spectrum of the Product: 9.98, 4.05τ (terminal double bond); triplet centered at 5.58τ (J=6.5 C.P.S.) (hydrogen on a carbon atom bearing hydroxy group).

|  | C | H | N | Molecular weight |
|---|---|---|---|---|
| Theoretical value | 61.83 | 7.36 | 14.48 | 97 |
| Analytical measured value | 61.48 | 7.24 | 14.42 | 100 |

Two grams of said product were dissolved in 2 ml. of pyridine and 10 ml. of acetic anhydride were added thereto, after which this solution was boiled under reflux. After pyridine, acetic anhydride and acetic acid were removed under reduced pressure, the residue thereof was distilled and then recrystallized from methanol and water, whereupon was obtained 4-vinyl-1-cyclohexene-1, 4-dicarbonitrile having a melting point of 55–56° C. and this product was identical with the sample. The structure of 2-(1-hydroxyethyl) acrylonitrile is certain from the above.

Example 3

5.3 grams of acrylonitrile and 11.6 grams of propionaldehyde were dissolved in 20 ml. of dioxane. While boiling this solution under reflux in a stream of nitrogen, 0.3 gram of tricyclohexylphosphine in 10 ml. of dioxane was added dropwise to the solution over a period of 15 minutes. After boiling the reaction mixture for 12 hours under reflux, the solvent was distilled off and the residue was subjected to vacuum distillation, whereupon was obtained 2-(1-hydroxypropyl) acrylonitrile having a boiling point of 60–61° C. (0.4 mm. Hg), at a conversion rate of 35% and a yield of 90%, based on the acrylonitrile.

Infrared Spectrum of the product: 2,229 cm.$^{-1}$ (CN); 1,623 cm.$^{-1}$ (c=c).

Nuclear Magnetic Resonance Spectrum of the product: 4.02$\tau$ (terminal double bond); triplet centered at 5.86$\tau$ (J=6.5 C.P.S.) (hydrogen on a carbon bearing hydroxyl group).

|  | C | H | N | Molecular weight |
|---|---|---|---|---|
| Theoretical value | 64.84 | 8.16 | 12.60 | 111 |
| Analytical measured value | 64.65 | 8.19 | 12.52 | 113 |

Example 4

A mixture of 5.3 grams of acrylonitrile, 7.2 grams of n-butylaldehyde and 1.2 grams of diphenyl-4-hydroxybutylphosphine was boiled under reflux for 7 hours under a stream of nitrogen. When the product was treated in customary manner, 2.7 grams of 2-(hydroxybutyl) acrylonitrile were obtained.

Infrared Spectrum of the product: 2,229 cm.$^{-1}$ (CN); 1,623 cm.$^{-1}$ (c=c).

Nuclear Magnetic Resonance Spectrum of the Product: 4.11$\tau$ (doublet: J=1.3 C.P.S.) 4.21$\tau$ (doublet: J=1.3 C.P.S.).

Ultimate Analysis of the Product:

|  | C | H | N | Molecular weight |
|---|---|---|---|---|
| Theoretical value | 75.45 | 5.70 | 8.80 | 157 |
| Analytical measured value | 75.88 | 5.76 | 8.93 | 148 |

Example 5

A mixture of 10 grams of acrylonitrile, 30 grams of benzaldehyde and 2 grams of diphenyl-4-hydroxybutylphosphine was stirred continuously for 20 hours in a stream of nitrogen at room temperature. When the product was treated in customary manner, 4.5 grams of 2-(alpha-hydroxybenzyl) acrylonitrile having a boiling point of 120–130° C. (0.2 mm. Hg) were obtained.

Example 6

Twenty cc. of commercial special grade acrylonitrile and 14 cc. of acetaldehyde were dissolved in a mixture of 30 cc. of pyridine and 10 cc. of dioxane, to which solution was then added 0.3 gram of tricyclohexylphosphine, following which the temperature of the mixture was raised to 120° C. and held thereat for 2 hours. The solvent and the unreacted acrylonitrile and acetaldehyde were recovered by rectification. Then by subjecting the mixture further to vacuum distillation, 6.2 grams of 2-(1-hydroxyethyl) and acrylonitrile were obtained.

Example 7

10.8 grams of commercial special grade acrylonitrile and 13.2 grams of acetaldehyde were dissolved in 20 cc. of triethylamine and then, after adding 0.25 gram of tricyclohexylphosphine, the temperature of the mixture was immediately raised to 110° C., at which temperature stirring of the mixture was carried out for 1 hour. The triethylamine and the unreacted acrylonitrile and acetaldehyde were recovered by rectification, followed by obtaining 5.8 grams of 2-(1-hydroxyethyl) acrylonitrile.

Example 8

13.3 grams of acrylonitrile and 14.5 grams of propionaldehyde were dissolved in a mixture of 20 ml. of pyridine and 15 ml. of dioxane, to which was then added 0.45 gram of tricyclohexylphosphine, after which the mixture was stirred for 18 hours at 120° C. After recovering the acrylonitrile and propionaldehyde by means of rectification, 8.7 grams of 2-(1-hydroxypropyl) acrylonitrile were obtained.

Example 9

Ten cc. of acrylonitrile and 18 cc. of propionaldehyde were dissolved in 40 cc. of pyridine, following which 0.3 gram of triethylphosphine was added to the solution which was then stirred for 3 hours at 120° C. After recovering the pyridine, acrylonitrile and propionaldehyde by means of rectification, 5.2 grams of 2-(1-hydroxypropyl) acrylonitrile were obtained.

Example 10

13.3 grams of acrylonitrile and 18 grams of butylaldehyde were dissolved in a mixture of 20 cc. of pyridine and 15 cc. of dioxane. After adding 0.47 gram of tricyclohexylphosphine to the mixture, the temperature thereof was raised to 120° C. at which temperature the mixture was maintained for 18 hours. After recovering the solvent and unreacted acrylonitrile and butylaldehyde, 8.5 grams of 2-(1-hydroxybutyl) acrylonitrile were obtained.

Example 11

Eight cc. of acrylonitrile and 10 cc. of butylaldehyde were mixed with 25 cc. of N-methylpyrrolidine, after which 0.25 gram of tributylphosphine was added to the mixture, which was then stirred for 20 hours at 115° C. The acrylonitrile and butylaldehyde were recovered by rectification, and further 5.5 grams of 2-(1-hydroxybutyl) acrylonitrile were obtained.

Example 12

9.3 grams of commercial first grade methyl acrylate, 14.5 grams of butylaldehyde and 0.5 gram of tricyclohexylphosphine were dissolved in 30 ml. of purified dioxane, following which the mixture was boiled under reflux for 15 hours in a stream of nitrogen. The solvent was then distilled off and the residue was subjected to vacuum distillation to obtain methyl 2-(1-hydroxybutyl) acrylate at a conversion rate of 70% and a yield of 83%, based on the methyl acrylate.

Infrared Spectrum of the Product: 1,722 cm.$^{-1}$ (ester carbonyl) 1,635 cm.$^{-1}$ (c=c).

Nuclear Magnetic Resonance Spectrum of the Product: 3.98, 4.02$\tau$ (terminal double bond); triplet centered at 5.79$\tau$ (J=6 C.P.S.) (hydrogen on a carbon atom bearing hydroxyl group).

Ultimate Analysis of the Product:

|  | C | H | Molecular weight |
|---|---|---|---|
| Theoretical value | 60.74 | 8.92 | 158 |
| Analytical measured value | 60.85 | 8.82 | 163 |

Example 13

0.8 gram of tricyclohexylphosphine was dissolved in 40 ml. of dioxane, and the solution was boiled under reflux in a stream of nitrogen. To this were then added dropwise over a period of 6 hours 25.8 grams of methyl acrylate and 26.4 grams of acetaldehyde in solution in 30 ml. of dioxane. After driving off the excess acetaldehyde and raising the boiling point, boiling under reflux was carried out for 3 more hours. When the solvent was distilled off from the reaction mixture, a small amount of pyrogallol was added thereto and the product was subjected to vacuum distillation, 6.2 grams of methyl 2-(1-hydroxyethyl) acrylate having a boiling point of 79–80° C. (9 mm. Hg) were obtained.

Infrared Spectrum of the Product: 1,719 cm.$^{-1}$ (ester carbonyl); 1,634 cm.$^{-1}$ (c=c).

Nuclear Magnetic Resonance Spectrum of the Product: 3.72$\tau$ (doublet: J=1.3 C.P.S.); 4.03$\tau$ (triplet: J=1.3 C.P.S.); 5.35$\tau$ (quartett: J=6 C.P.S.).

Ultimate Analysis of the Product:

|  | C | H | Molecular weight |
|---|---|---|---|
| Theoretical value | 55.37 | 7.75 | 130 |
| Analytical measured value | 55.73 | 7.66 | 138 |

Example 14

Except that ethyl acrylate was used instead of methyl acrylate, the experiment was otherwise carried out as in Example 13 to obtain ethyl 2-(1-hydroxyethyl) acrylate at a conversion rate of 25% and a yield of 89%.

Example 15

8.6 grams of methyl acrylate and 12 grams of propionaldehyde were dissolved in 30 ml. of dioxane and then while boiling this solution under reflux in a stream of nitrogen, 0.4 gram of tricyclohexylphosphine in 10 ml. of dioxane was added dropwise to the solution over a 20-minute period. After boiling the reaction mixture under reflux for 15 hours, the solvent was distilled off and the residue was subjected to vacuum distillation, whereupon methyl 2-(1-hydroxypropyl) acrylate having a boiling point of 55–56° C. (2 mm. Hg) was obtained at a conversion rate of 32% and a yield of 85%, based on the methyl acrylate.

Example 16

A mixture of 8.8 grams of ethyl acrylate, 7.2 grams of butylaldehyde and 1.2 grams of diphenyl-4-hydroxybutylphosphine was boiled under reflux for 10 hours under a stream of nitrogen. When the product was treated in customary manner, 3.5 grams of ethyl 2-(1-hydroxybutyl) acrylate having a boiling point of 70–71° C. (0.3 mm. Hg) were obtained.

Example 17

A mixture of 16 grams of methyl acrylate, 30 grams of benzaldehyde and 2 grams of diphenyl-4-hydroxybutylphosphine was stirred continuously for 20 hours at 30–35° C. in a stream of nitrogen. When the product was distilled, 6.2 grams of methyl 2-(alpha-hydroxybenzyl) acrylate having a boiling point of 103–105° C. (0.1 mm. Hg) was obtained.

Example 18

0.53 gram of tricyclohexylphosphine-carbon disulfide addition product was dissolved in 10 cc. of ethanol in a stream of nitrogen, after which the ethanol was slowly distilled off. After the formation of the distillate had stopped, 15 cc. of dioxane was added and the mixture was boiled to distill off 5 cc. of the dioxane. After cooling the mixture to 0° C., 11 grams of acrylonitrile, 12 grams of n-octanal, 10 ml. of dioxane and 20 ml. of pyridine were added thereto, following which the mixture was heated for 12 hours at 120° C. in a sealed tube. The solvent was then driven off under reduced pressure, following which the residue was purified by means of alumina column chromatography. 2-(1-hydroxyoctyl) acrylonitrile having a boiling point of 107–108° C. (0.7 mm. Hg) was obtained at a conversion rate of 45% and a yield of 52%.

If, instead of n-octanal, an equimolar quantity of cyclohexylaldehyde, cyclo-octylaldehyde, n-caproaldehyde, p-tolualdehyde and alpha-phenylacetaldehyde are used, 2-(alpha - hydroxycyclohexylmethyl) acrylonitrile (B.P. 105–106° C., 1 mm. Hg), 2-(alpha-hydroxycyclooctylmethyl) acrylonitrile (B.P. 60–61° C., 1 x 10$^{-4}$ mm. Hg), 2-(1-hydroxycapryl) acrylonitrile (B.P. 70° C., 1 x 10$^{-4}$ mm. Hg.), 2-(alpha-hydroxy-p-methylbenzyl) acrylonitrile (B.P. 128–130° C., 0.2 mm. Hg) and 2-(alpha-hydroxy-beta-phenylethyl) acrylonitrile (B.P. 157–160° C., 1 x 10$^{-4}$ mm. Hg) are obtained respectively.

Example 19

Six grams of p-chlorobenzaldehyde and 5.3 grams of acrylonitrile were dissolved in a mixture of 90 ml. of dioxane and 20 ml. of pyridine. To this mixture was then added a solution of 0.6 gram of tricyclohexylphosphine in 30 ml. of dioxane, after which the mixture was held at 30° C. in a sealed tube for 10 hours. After opening the tube, 0.3 ml. of concentrated hydrochloric acid was added to the content, the solvent was distilled off and thereafter the residue was subjected to vacuum distillation, whereupon were obtained 6.5 grams of 2-(alpha-hydroxy-p-benzyl) acrylonitrile having a boiling point of 140–150° C. (0.2 mm. Hg).

By following the hereinabove described procedure, 5 grams of 2-(alpha-hydroxy-p-methylbenzyl) acrylonitrile having a boiling point of 128–130° C. (0.2 mm. Hg) were obtained from 6 grams of p-tolualdehyde and 5.3 grams of acrylonitrile. Similarly, 6.2 grams of 2-alpha-hydroxy-m-nitrobenzyl) acrylonitrile having a boiling point of 160–165° C. (1 x 10$^{-4}$ mm. Hg) were obtained from 6 grams of m-nitrobenzaldehyde and 5 grams of acrylonitrile. Further, 7.2 grams of 2-(alpha-hydroxy-p-carbomethoxybenzyl) acrylonitrile having a boiling point of 150–155° C. (1 x 10$^{-4}$ mm. Hg) were obtained from 6.8 grams of p-carbomethoxybenzaldehyde and 5.3 grams of acrylonitrile.

Example 20

Three grams of n-octyl acrylate and 1.4 grams of acetaldehyde were dissolved in 30 ml. of dioxane followed by addition thereto of 0.035 gram of tricyclohexylphosphine. This mixture was then reacted in a sealed tube for 2 hours at 120–130° C. When the reaction product was subjected to a purification treatment according to customary procedures, 1.5 grams of actyl 2-(1-hydroxyethyl) acrylate having boiling point of 120–121° C. (7 mm. Hg) was obtained.

When the reaction was carried out as hereinabove described except that n-butyl acrylate and benzyl acrylate were used instead of octyl acrylate, n-butyl 2-(1-hydroxyethyl) acrylate (B.P. 70–71° C., 4 mm. Hg) and benzyl 2-(1-hydroxyethyl) acrylate (B.P. 135–137° C., 4 mm. Hg) were obtained respectively.

Example 21

A solution of 0.8 gram of tricyclohexylphosphine in 80 ml. of dioxane was added to a solution of 5.7 grams of allyl acrylate and 3.6 grams of n-butylaldehyde in 20 ml. of dioxane, following which the mixture was boiled under reflux for 3 hours. When 0.5 gram of acetic acid was added to the mixture which was then subjected to distillation, 3.1 grams of allyl 2-(1-hydroxy-n-butyl) acrylate having a boiling point of 77° C. (1 mm. Hg) were obtained.

Example 22

To a solution of 7 grams of benzaldehyde and 7 grams of acrylonitrile in 85 ml. of dioxane was added a solution of 20 ml. of pyridine and 2 millimoles of a below-indicated tertiary phosphine in 20 ml. of dioxane, following which the mixture was allowed to stand for 6 hours at 30° C. in a sealed tube. Thereafter, a small quantity of concentrated HCl was added to the contents and solvent was distilled off. This was followed by diluting the reaction product with ether, washing with water and drying, followed by subjecting the reaction product to distillation. The yield was as follows:

| Tertiary phosphine: | Yield, g |
|---|---|
| Tricyclohexylphosphine | 5.5 |
| Tricyclopentylphosphine | 5.1 |
| Tribornylphosphine | 5.2 |
| Tri-n-octylphosphine | 1.6 |
| Tri-n-butylphosphine | 2.2 |
| Triisopropylphosphine | 3.1 |
| Phenyl diethylphosphine | 0.8 |

Example 23

2.65 grams of acrylonitrile and 3.24 grams of n-butylaldehyde were dissolved in 15 ml. of a solvent indicated below. After adding a 1-ml. dioxane solution of 0.19 gram of tricyclohexylphosphine, the reaction was carried out for 15 hours at 120–125° C. After cooling the reaction mixture, a small quantity of acetic acid was added, followed by distilling off the solvent. The reaction product was then subjected to distillation to isolate 2-(1-hydroxybutyl) acrylonitrile. The yield was as follows:

| Solvent: | Yield, g |
|---|---|
| Acetonitrile | 1.8 |
| Cyclohexane | 1.1 |
| Tert.-butylalcohol | 0.9 |
| Dioxane | 2.7 |
| Tetrahydrofuran | 2.7 |
| Diethylene glycol methyl ether | 2.2 |
| Dimethylformamide | 2.4 |
| Toluene | 1.6 |
| Pyridine | 3.4 |
| Benzene | 1.9 |

What is claimed is:

1. Acrylonitrile derivatives having the formula:

$$CH_2=C-CN$$
$$\quad\;\; |$$
$$R-CH-OH$$

wherein R is a hydrocarbon radical selected from the group consisting of alkyl groups having up to 12 carbon atoms, cycloalkyl groups having 5 to 12 carbon atoms, aryl groups having 6 to 12 carbon atoms, aralkyl groups having 7 to 12 carbon atoms, alkenyl groups having 3 to 8 carbon atoms, said aryl and aralkyl groups further having a substituent selected from the group consisting of chloro, nitro, lower alkoxy and lower carboalkoxy groups.

2. 2-(1-hydroxyalkyl) acrylonitriles wherein the alkyl radical contains up to 12 carbon atoms.

3. 2-(alpha-hydroxybenzyl) acrylonitriles having the formula

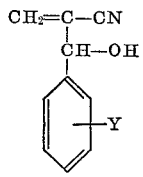

wherein Y is a monovalent radical selected from the group consisting of hydrogen, chlorine, nitro, lower alkyl, lower alkoxy and lower alkoxycarbonyl radicals.

4. A process for preparing alpha, beta-ethylenically unsaturated compounds having the formula:

$$CH_2=C-CN[X]$$
$$\quad\;\; |$$
$$R-CH-OH$$

wherein R is a hydrocarbon radical selected from the group consisting of alkyl groups having up to 12 carbon atoms cycloalkyl groups having 5 to 12 carbon atoms, aryl groups having 6 to 12 carbon atoms, aralkyl groups having 7 to 12 carbon atoms and alkenyl groups having 3 to 8 carbon atoms and said aryl and aralkyl groups further having a substituent selected from the group consisting of a chloro, nitro, lower alkoxy and lower carboalkoxy groups, which comprises reacting an alpha, beta-ethylenically unsaturated compound having the formula:

$$CH_2=CH-CN$$

with an aldehyde having the formula:

$$RCHO$$

wherein R has the same meaning as defined above, at a temperature of from −20° C. to 250° C. in the presence of a catalyst in an amount of 0.0001 to 0.1 mole per mole of said alpha, beta-ethylenically unsaturated compound, said catalyst being selected from the group consisting of compounds having the formula $$R^1R^2R^3P$$

wherein $R^1$, $R^2$ and $R^3$ each are hydrocarbyl groups having up to 12 carbon atoms selected from the group consisting of alkyl groups, cycloalkyl groups and aryl groups with the proviso that at least one of $R^1$, $R^2$ and $R^3$ is an alkyl or cycloalkyl group, and compounds having the formula $$R^4-PR^5$$

wherein $R^4$ is a hydrocarbyl group having up to 12 carbon atoms selected from the group consisting of alkyl groups and cycloalkyl groups and $R^5$ is a divalent hydrocarbyl group selected from the group consisting of alkylene and alkylene groups.

5. The process according to claim 4 wherein said material alpha, beta-ethylenically unsaturated compound is acrylonitrile and a tertiary amine whose PKa at 25° C. is at least 5 is added to the reaction system.

6. The process according to claim 5 wherein said tertiary amine is added in an amount of 0.01 to 10 moles per each mole of said acrylonitrile.

References Cited

UNITED STATES PATENTS 3,361,785   1/1968   McClure _____ 260—465

CHARLES B. PARKER, Primary Examiner

S. T. LAWRENCE, Assistant Examiner

U.S. Cl. X.R.

260—88.7, 89.5, 464, 465.6, 473, 484, 521, 535